United States Patent
Hietaniemi et al.

(10) Patent No.: US 10,787,768 B2
(45) Date of Patent: Sep. 29, 2020

(54) METHOD FOR MANUFACTURE OF PAPER, BOARD OR THE LIKE AND USE OF THE COMPOSITION

(71) Applicant: Kemira Oyj, Helsinki (FI)

(72) Inventors: Matti Hietaniemi, Espoo (FI); Jaakko Ekman, Helsinki (FI); Asko Karppi, Turku (FI); Kimmo Strengell, Espoo (FI)

(73) Assignee: Kemira Oyj, Helsinki (FI)

( * ) Notice: Subject to any disclaimer, the term of this patent is extended or adjusted under 35 U.S.C. 154(b) by 46 days.

(21) Appl. No.: 16/317,590

(22) PCT Filed: Sep. 4, 2017

(86) PCT No.: PCT/FI2017/050621
§ 371 (c)(1),
(2) Date: Jan. 14, 2019

(87) PCT Pub. No.: WO2018/046794
PCT Pub. Date: Mar. 15, 2018

(65) Prior Publication Data
US 2019/0218717 A1    Jul. 18, 2019

(30) Foreign Application Priority Data

Sep. 7, 2016   (FI) ..................................... 20165664

(51) Int. Cl.
| D21H 17/37 | (2006.01) |
| D21H 17/45 | (2006.01) |
| D21H 17/14 | (2006.01) |
| D21H 17/42 | (2006.01) |
| D21H 21/10 | (2006.01) |
| D21H 21/36 | (2006.01) |
| D21H 23/18 | (2006.01) |
| D21H 21/18 | (2006.01) |
| D21H 17/15 | (2006.01) |
| D21H 11/04 | (2006.01) |
| D21H 11/14 | (2006.01) |

(52) U.S. Cl.
CPC ........... *D21H 17/375* (2013.01); *D21H 17/14* (2013.01); *D21H 17/15* (2013.01); *D21H 17/37* (2013.01); *D21H 17/42* (2013.01); *D21H 17/455* (2013.01); *D21H 21/10* (2013.01); *D21H 21/18* (2013.01); *D21H 21/36* (2013.01); *D21H 23/18* (2013.01); *D21H 11/04* (2013.01); *D21H 11/14* (2013.01)

(58) Field of Classification Search
None
See application file for complete search history.

(56) References Cited

U.S. PATENT DOCUMENTS

| 5,008,319 A | 4/1991 | Highsmith et al. |
| 5,393,381 A | 2/1995 | Hund et al. |
| 5,571,380 A | 11/1996 | Fallon |
| 2004/0034145 A1 | 2/2004 | Fischer et al. |
| 2006/0084771 A1 | 4/2006 | Wong Shing et al. |
| 2006/0254464 A1 | 11/2006 | Nyander et al. |
| 2007/0078233 A1* | 4/2007 | Proverb ................ C08F 265/00 525/420 |
| 2011/0155339 A1 | 6/2011 | Brungardt et al. |

FOREIGN PATENT DOCUMENTS

| CN | 102134297 B | 10/2012 |
| EP | 0222579 A2 | 5/1987 |
| EP | 0328756 A1 | 8/1989 |
| EP | 1849803 A1 | 10/2007 |
| JP | 2013023520 A | 2/2013 |
| WO | 2012058258 A1 | 5/2012 |
| WO | 2016102753 A1 | 6/2016 |
| WO | 2016120524 A1 | 8/2016 |

OTHER PUBLICATIONS

Finnish Patent and Registration Office, Search Report of FI20165664, dated Mar. 20, 2017. 2 pages.

* cited by examiner

*Primary Examiner* — Dennis R Cordray
(74) *Attorney, Agent, or Firm* — Berggren LLP

(57) ABSTRACT

A method for manufacture of paper, board or the like, comprising the step of dissolving a composition into aqueous solution, whereby an aqueous treatment solution is obtained for adding the obtained treatment solution to the pulp. The composition comprising a copolymer of acrylamide and at least one cationic monomer, the copolymer comprising cationic monomers at least 15 mol-%, calculated from total amount of monomers, and an ionic crosslinker agent comprising at least two carboxyl groups, wherein the equivalent ratio of carboxyl groups:cationic monomer is between 1:20 and 1:0.5.

20 Claims, No Drawings

METHOD FOR MANUFACTURE OF PAPER, BOARD OR THE LIKE AND USE OF THE COMPOSITION

PRIORITY

This application is a U.S. national application of the international application number PCT/FI2017/050621 filed on Sep. 4, 2017 and claiming priority of Finnish national application 20165664 filed on Sep. 7, 2016 the contents of all of which are incorporated herein by reference.

The present invention relates to a method for manufacture of paper, board or the like and use of the composition for manufacture in paper, board or the like according to the preambles of the independent claims presented below.

Recycled fibre material is commonly used as raw material for paper or board. The recycled fibre material comprises in addition to the fibres a number of other substances. When recycled fibre material is formed into pulp particulate foreign material is separated from the pulp in a pulper or at screening. Some non-particulate substances are naturally retained on the fibres and do not cause major disturbances in the process. Other substances, such as stickies, may be separated from the pulp at the screening and removed from the process.

Typically recycled fibre material comprises starch, originating from surface sizing of the paper or board used as pulping raw material. The starch retains poorly on the fibres as it typically has no charge at all or a slightly anionic charge. Furthermore, due to its relatively small size starch is not effectively separated at the screening either. Thus starch remains in the water circulation of the pulping process or is removed together with the screen effluent to the wastewater treatment. Starch may cause foaming as well as high biological oxygen demand (BOD) and chemical oxygen demand (COD) levels in the circulation water. The risk for microbial growth in the process also increases, as starch is suitable nutritive substance for various microbes. Consequently, the retention of starch from the recycled raw material is important, but however challenging.

Some of the current concepts use two cationic polymers, but the cost for this kind of two polymer system is high. Typically different polymers are needed for fixing, retention, strength and drainage possessing different molecular weights, charges etc. to achieve these effects. Typically strength polymers having relatively low molecular weight can only be manufactured as solutions because the manufacturing method limits the molecular weight of dry polymers to a higher range. Dry polymers are typically used as flocculants due to their high molecular weight and strength polymers do not typically provide drainage and retention improvements due to their low molecular weight.

Additionally challenge with recycled fibre material is to have performance in high conductivity conditions. Linear cationic polymers have the drawback that they cannot be added in increasing amounts due to overflocculation and overcationization, which causes bad formation, so desired levels of retention, drainage and strength are not necessarily achieved. Also, they might cause excessive foaming in the manufacturing process. The performance is decreased especially in an elevated conductivity, as the higher salt concentrations release the ionic bonds between the linear cationic polymer and fibres.

The object of the present invention is to minimize or even eliminate the disadvantages existing in the prior art.

One object of the present invention is to provide a method for manufacture of paper, board or the like with which the starch retention and drainage are improved.

It is especially an object of the present invention to provide a method for improving paper strength properties and retention of starch with a recycled or unbleached fibre material, particularly in high conductivity conditions.

In order to achieve among others the objects presented above, the invention is characterized by what is presented in the characterizing parts of the enclosed independent claims.

Some preferred embodiments of the invention will be described in the dependent claims.

The embodiments and advantages mentioned in this text relate, where applicable, both to the method and to the uses according to the invention, even though it is not always specifically mentioned.

In a typical method for making of paper, board or the like, the process employing recycled fibre as raw material, where
  providing pulp,
  dissolving a composition comprising
    (i) a copolymer of acrylamide and at least one cationic monomer, the copolymer comprising cationic monomers at least 15 mol-%, calculated from total amount of monomers, and
    (ii) an ionic crosslinker agent comprising at least two carboxyl groups, wherein the equivalent ratio of carboxyl groups:cationic monomer is between 1:20 and 1:0.5,
  into an aqueous solution such as water, whereby an aqueous treatment solution is obtained,
  adding the obtained treatment solution to the pulp, and
  forming the pulp into a fibrous web.

Now it has been surprisingly found that a composition comprising copolymer of acrylamide and at least one cationic monomer, and an ionic crosslinker agent, improves a papermaking process and the obtained paper in terms of retention of starch and colloids, drainage, and strength. These improvements are believed to originate from a reversible 3-dimensional (3D) structure resulting from ionic interactions between the ionic crosslinker agent with at least two carboxyl groups and cationic monomers present in the copolymer of acrylamide and cationic monomers. Formation of a 3D structure can be seen e.g. as reduced viscosity of the ionically crosslinked cationic polyacrylamide compared to a linear i.e. ionically non-crosslinked cationic polyacrylamide. The 3D structure facilitates higher dosage without causing overflocculation and thereby deteriorated formation, when in aqueous environment; a polyion complex is formed by the cationic polymer and the ionic crosslinker. Typically, a structure obtained by ionic interactions opens up when the composition is diluted. However when using in environment where the conductivity, i.e. salt concentration, is elevated the presented copolymer stays in compressed structure, allowing both higher cationicity of the polymer and increased dosages without overflocculation. In other words, in low conductivity conditions the polymer structure would open up after dosage to the pulp generating large flocs that would be good for retention of fibres and fillers, but are not beneficial for paper strength. The composition comprising copolymer of acrylamide and at least one cationic monomer, and an ionic crosslinker agent, is beneficial for the strength, drainage, retention of starch and colloids, and fixation, so that water circulation of the paper mill remains cleaner. The 3-dimensional structure obtained by ionic crosslinking is also beneficial for the drainage. Especially, when using pulp having conductivity at least 1 mS/cm, preferably at least 2.5 mS/cm, more preferably at least 3 mS/cm, and even more preferably at least 3.5 mS/cm in the head box stock, it is achieved improved strength, drainage, retention of starch and colloids and fixation.

The composition used in the method according to the invention comprises an ionic crosslinker agent comprising at least two carboxyl groups. As used herein, by carboxyl group is meant a —COOH group regardless of whether in protonated or deprotonated form. The equivalent ratio of carboxyl groups:cationic monomer is between 1:20 and 1:0.5, preferably between 1:15 and 0.8, more preferably between 1:10 and 1:1. If the amount of ionic crosslinker agent is higher, then it consumes too many of the cationic charges of the copolymer of acrylamide and at least one cationic monomer resulting in decreased performance as strength, retention of starch and colloids and/or drainage aid. Additionally higher amounts do not bring any further performance benefit but dilute the amount of the polymer. If the amount of ionic crosslinker agent is less, then there are too few ionic crosslinks to create the 3D structure to the polymer resulting in decreased performance as strength, retention of starch and colloids and/or drainage aid.

The copolymer and the ionic crosslinker agent of the composition form an ionically crosslinked copolymer in an aqueous solution, the ionically crosslinked copolymer having a standard viscosity in the range of 2.0-5.5 mPas, as measured by a Brookfield DV I+ viscometer at 25° C. from a 1.0 (w/w) sample in 5.5% (w/w) NaCl solution. The standard viscosity reflects the amount of ionic crosslinks presence in the copolymer, and on the other hand the magnitude of the molecular weight of the copolymer. Without the presence of the ionic crosslinker, the standard viscosity would be higher, even for the same copolymer. The standard viscosity of 2.0-5.5 mPas is approximated to correspond a weight average molecular weight MW in the range of 3 000 000-20 000 000 g/mol, that is needed for the performance in papermaking, especially as strength, retention of starch and colloids and/or drainage aid.

According to one embodiment of the invention the standard viscosity of the ionically crosslinked copolymer of acrylamide and at least one cationic monomer is in the range of 2.2-5.0 mPas, preferably 2.4-4.0 mPas, more preferably 2.5-3.5 mPas as measured by a Brookfield DV I+ viscometer at 25° C. from a 1.0% (w/w) sample in 5.5% (w/w) NaCl solution. These standard viscosities are approximated to correspond a weight average molecular weight MW of the acrylamide copolymer in the range of 4 000 000-15 000 000 g/mol, or in the range of 5 000 000-9 000 000 g/mol. It has been found that the specified standard viscosities provide clear improvement in drainage and retention of starch and colloids, and strength properties of the final paper or board product.

According to one embodiment of the invention the ionic crosslinker agent is citric acid, adipic acid, malonic acid, succinic acid, or any mixture thereof. Preferably, the ionic crosslinker agent comprises citric acid and adipic acid; most of the ionic crosslinker agent originates from citric acid. Citric acid provides at least two functionally active or available carboxyl groups at pH 3.5-6 which is needed for typical cationic polymer solution and which makes it highly compatible with copolymer of acrylamide. These ionic crosslinker agents are available in powder form, which enables the production of the composition in dry particulate form, as described later in this application. Furthermore, adipic acid and citric acid are acceptable for use in paper or board grades that come into contact with food or beverages. Additionally citric acid, as tribasic crosslinker agent, was demonstrated to provide increased structure to the copolymer in terms of reduced viscosity of the ionically crosslinked cationic polyacrylamide solution, compared to adipic acid which is a dibasic crosslinker. It has also been observed that the ionic crosslinker agent, especially citric acid, protects cationic groups of the polymer for hydrolysis in an aqueous solution. Further, the citric acid minimizes or even inhibits microbial growth in an aqueous solution of the composition.

According to an embodiment of the invention the amount of ionic crosslinker agent may be at least 2 weight-%, preferably at least 2.5 weight-% or at least 3 weight-% or in some embodiments at least 3.5 weight-%. According to an embodiment of the invention the amount of ionic crosslinker agent may be in the range of 2-20 weight-% of copolymer of acrylamide expressed as citric acid equivalent, preferably 2.5-20 weight-%, more preferably 3.5-20 weight-%, even more preferably 5.5-20 weight-%. In some embodiments of the invention the amount of ionic crosslinker agent may be in the range of 3.5-15 weight-%, more preferably 5.5-10 weight-%.

According to the invention the copolymer of acrylamide comprises cationic monomers at least 15 mol-%, calculated from total amount of monomers. According to one preferable embodiment of the invention the copolymer of acrylamide comprises cationic monomers at least 20 mol-%, preferably at least 30 mol-%, more preferably at least 40 mol-% and even more preferably at least 45 mol-%. The amount of cationic monomers in the copolymer provides desired three dimensional structures by enabling the interaction of the copolymer with the ionic crosslinker agent. Additionally the higher cationicity was demonstrated to provide improved starch retention, filtrate turbidities, and strength compared to e.g. cationicity of 10 mol-%. The copolymer of acrylamide may comprise cationic monomers in the range of 20-99 mol-%, preferably 30-99 mol-%, more preferably 40-80 mol-% and even more preferably 45-65 mol-%. If the amount of cationic monomers is too high, the resulting copolymer may have too high cationic charge density and cause foaming, which may reduce fixation of other additives on the fibres.

The copolymer is obtained by polymerising acrylamide and at least one cationic monomer. The cationic monomer may be selected from 2-(dimethylamino)ethyl acrylate (ADAM), [2-(acryloyloxy)ethyl] trimethylammonium chloride (ADAM-Cl), 2-dimethylaminoethyl methacrylate (MADAM), [2-(methacryloyloxy)ethyl] trimethylammonium chloride (MADAM-Cl), [3-(acryloylamino)propyl] trimethylammonium chloride (APTAC), [3-(methacryloylamino)propyl] trimethylammonium chloride (MAPTAC), or any combinations thereof. Preferably the cationic monomers are selected from group consisting of 2-(dimethylamino)ethyl acrylate (ADAM), [2-(acryloyloxy)ethyl] trimethylammonium chloride (ADAM-Cl), [2-(methacryloyloxy)ethyl] trimethylammonium chloride (MADAM-Cl), [3-(acryloylamino)propyl] trimethylammonium chloride (APTAC), and [3-(methacryloylamino)propyl] trimethylammonium chloride (MAPTAC), or any combinations thereof. More preferably the cationic monomer is selected from 2-(dimethylamino)ethyl acrylate (ADAM), [2-(acryloyloxy)ethyl] trimethylammonium chloride (ADAM-Cl) and any combinations thereof. These monomers hydrolyse relatively easily, e.g. at elevated temperatures, so they may undergo hydrolysis forming anionic groups e.g. during drying in the manufacturing, thereby enhancing formation of 3-dimensional structure by further ionic interactions. On the other hand when dissolved into water, the ionic crosslinker agent, especially citric acid, protects cationic groups of the polymer for further hydrolysis.

The acrylamide copolymer may also comprise at least one structural unit originating from anionic monomer(s), provided that the net charge of the copolymer is cationic at pH 7. The acrylamide copolymer may thus comprise both cationic and anionic functional groups. According to an embodiment of the invention, the copolymer of acrylamide comprises 0.05-15 mol-%, preferably 0.1-10 mol-% of anionic monomers, calculated from total amount of monomers.

The anionic monomer may be selected from unsaturated mono- or dicarboxylic acids, such as (meth)acrylic acid, maleic acid, fumaric acid, itaconic acid, aconitic acid, mesaconic acid, citraconic acid, crotonic acid, isocrotonic acid, angelic acid or tiglic acid. Preferably the anionic monomers are selected from (meth)acrylic acid, itaconic acid, and more preferably the anionic monomer is acrylic acid.

According to one embodiment of the invention the composition comprise a copolymer of acrylamide, which is obtained by gel polymerisation process. In gel polymerisation the used monomers are polymerised in presence of initiator(s) by using free radical polymerisation. The temperature at the beginning of the polymerisation process may be less than 40° C., sometimes less than 30° C. The free radical polymerisation of the monomers produces copolymer of acrylamide, which is in gel form or highly viscous liquid. After the gel polymerisation, the obtained copolymer in gel form is comminuted, such as shredded or chopped, as well as dried, whereby a dry particulate copolymer is obtained. Depending on the used reaction apparatus, shredding or chopping may be performed in the same reaction apparatus where the polymerisation takes place. For example, polymerisation may be performed in a first zone of a screw mixer, and the shredding of the obtained polymer is performed in a second zone of the said screw mixer. It is also possible that the shredding, chopping or other particle size adjustment is performed in a treatment apparatus, which is separate from the reaction apparatus. For example, the obtained water-soluble copolymer may be transferred from the second end of a reaction apparatus, which is a belt conveyor, through a rotating hole screen or the like, where it is shredded or chopped into small particles. After shredding or chopping the comminuted copolymer is dried, milled to a desired particle size and packed for storage and/or transport.

According to one preferable embodiment the copolymer of acrylamide is a linear copolymer at the end of the polymerisation process. In other words, the copolymer of acrylamide is unbranched and free of permanent crosslinkages. According to one embodiment the polymerisation of acrylamide and the at least one cationic monomer is completely free of cross-linkers, which provide permanent cross-linking bonds.

When the copolymer in the composition is obtained by gel polymerisation, the ionic crosslinker agent may be added for example to the monomers before polymerization, to gel before or during the comminution. Alternatively, the composition according to present invention may be obtained by mixing a copolymer in particle or powder form with at least part of ionic crosslinking agent in particle or powder form. Mixing of two particulate powders is easy to carry out, also in industrial scale, and it may provide more degrees of freedom in proportions of individual components.

According to one embodiment of the invention the composition comprises 60-97 weight-%, preferably 70-94 weight-%, more preferably 78-90 weight-%, of the copolymer of acrylamide, based on the dry solids content of the composition. The amount of copolymer in the composition is high especially when the composition is in form of powder. High polymer content is beneficial in view of storage and transport properties of the composition.

The amount of residual cationic monomer in the composition may be at most 5000 ppm. The amount of residual acrylamide monomer in the composition may be at most 1000 ppm, preferably at most 700 ppm, more preferably at most 500 ppm. The amount of residual monomers is preferably as low as possible, especially if the composition is used for manufacture of paper or board grades that come into contact with food or beverages. Especially if the composition is used for manufacture of paper or board grades that come in to contact with organic food or beverages, the amount of residual monomers is preferably minimised.

According to one embodiment of the invention the composition may be in form of dry powder, which is water soluble. The term "water-soluble" is understood in the context of the present application that the composition and its constituents are fully miscible with water. When mixed with excess of water the composition is preferably fully dissolved and the obtained solution is preferably essentially free from any discrete particles or granules. Excess of water means that the obtained solution is not a saturated solution in regard of any constituents present.

According to an embodiment of the invention, a moisture content of a dry powder of the composition may be at most 15 weight-%. Typically the moisture content may be 3-15 weight-%, in some embodiments typically 5-12 weight-%.

According to one embodiment of the invention the composition comprising
(i) a copolymer of acrylamide and at least one cationic monomer, the copolymer comprising cationic monomers at least 15 mol-%, calculated from total amount of monomers, and
(ii) an ionic crosslinker agent comprising at least two carboxyl groups, wherein the equivalent ratio of carboxyl groups:cationic monomer is between 1:20 and 1:0.5, preferably between 1:15 and 0.8, more preferably between 1:10 and 1:1,
is used as dry strength agent for manufacture in paper, board or the like.

According to another embodiment of the invention the composition comprising
(i) a copolymer of acrylamide and at least one cationic monomer, the copolymer comprising cationic monomers at least 15 mol-%, calculated from total amount of monomers, and
(ii) an ionic crosslinker agent comprising at least two carboxyl groups, wherein the equivalent ratio of carboxyl groups:cationic monomer is between 1:20 and 1:0.5, preferably between 1:15 and 0.8, more preferably between 1:10 and 1:1,
is used as drainage agent and/or retention agent for starch and colloids for manufacture in paper, board or the like. Preferably no other synthetic organic drainage aids are used, i.e. the paper or board making process is free of other organic drainage aids.

The composition according to the present invention may be used in manufacture of kraft paper, liner board, test liner, fluting, sack paper, white lined chipboard (WLC), core board, or folding boxboard (FBB). Boards may have grammage from 120 to 500 g/m$^2$ and they may be based 100% on primary fibres, 100% on recycled fibres, or to any possible blend between primary and recycled fibres.

According to the method for making of paper, board or the like, the process employing recycled fibre as raw material, where a composition according to the invention is dissolved into an aqueous solution such as water, whereby an aqueous treatment solution is obtained, and the obtained treatment solution is added to the pulp. According to one preferred embodiment of the method the pulp comprises at least 50 weight-% of dry fibre furnish recycled paper, board or the like pulped in a pulper and/or unbleached kraft pulp and/or unbleached semichemical pulp, preferably recycled paper, board or the like pulped in a pulper.

According to one preferred embodiment of the invention, the pulp has a conductivity at least 1 mS/cm, preferably at least 2.5 mS/cm, more preferably at least 3 mS/cm, and even more preferably at least 3.5 mS/cm in the head box stock. Typically, the pulp has conductivity at most 15 mS/cm, 10 mS/cm, 8 mS/cm, 6 mS/cm or 5.5 mS/cm in the head box stock. According to an embodiment of the invention, the pulp conductivity may vary in the range of 1-15 mS/cm, preferably 2.5-15 mS/cm, more preferably 3-15 mS/cm and even more preferably 3.5-15 mS/cm in the head box stock. Especially, when using pulp having conductivity in the range of 1-10 mS/cm, preferably 2.5-10 mS/cm, more preferably 3-10 mS/cm, and even more preferably 3.5-10 mS/cm in the head box stock, it is achieved improved strength, drainage, retention of starch and colloids and fixation. In some embodiments of the invention the pulp conductivity may be in the range of 1-10 mS/cm, preferably 2.5-8 mS/cm, more preferably 3-6 mS/cm, and even more preferably 3.5-5.5 mS/cm in the head box stock.

According to one embodiment of the invention, the pulp comprises starch in an amount of at least 0.5 weight-%, preferably at least 2 weight-%, more preferably at least 3 weight-%, and even more preferably at least 4 weight-%, based on dry total solids, as measured at a pulp storage or at a broke storage, preferably at the outlet pump of the pulp or broke storage. The starch content of the pulp may be, for example, in the range of 1-20 weight-%, preferably 2-10 weight-%, preferably 4-8 weight-%, based on dry total solids, as measured after a pulp storage or a broke storage.

According to one embodiment of the invention the composition is used in an amount of 50-1000 dry g/t dry pulp, preferably 150-900 dry g/t dry pulp, more preferably 300-800 dry g/t dry pulp.

According to one embodiment of the invention the obtained treatment solution is added to the fibre pulp after the last shear stage and prior to a head box of a paper or board machine. The treatment solution is thus added to the thin fibre stock, which has consistency of <3%, preferably less than 2.5%, more preferably less than 2%. The addition to the thin stock may be advantageous especially for the drainage. According to one embodiment of the invention the obtained treatment solution is added to the pulp fraction from the pulper as the copolymer in the treatment solution comes more easily in contact with the starch and fibres. In this way the retention of the starch to the paper web can be effectively improved.

It is also possible to add at least one amylase enzyme inhibitor and/or biocide to the pulp and/or broke in order to control microbial activity in the process. Enzyme inhibitor and/or biocide reduce the degradation of starch due to microbial activity. In this manner more starch is available for interaction with the composition according to the present invention.

Biocide and/or amylase enzyme inhibitor may be added to the pulper or to a flow in the process, such as pulp flow or process water flow. Preferably biocide and/or amylase enzyme inhibitor is added to the process before the pulp storage towers or silos located after the pulp thickening step. Biocide and/or enzyme inhibitor may be added to the pulp in the pulper or before thickening of the screened pulp. According to one preferred embodiment of the present invention biocide or amylase enzyme inhibitor is added to the pulp flow within 2 hour from the moment when the pulp flow exits the pulper. Further, the biocide or the amylase enzyme inhibitor may be added to the pulp between inlet of the pulper and thickening of the screened pulp. Early addition of biocide or amylase enzyme inhibitor is preferred, as it minimises further degradation of starch, and may improve the coagulation and flocculation of the low molecular starch, and thereby retention of the starch to the recycled fibres. It is possible to add biocide and/or amylase enzyme inhibitor only at one biocide feeding location. Alternatively, biocide and/or amylase enzyme inhibitor may be added at several separate feeding locations, spaced apart from each other, whereby the addition of biocide may be targeted at known problem points of the process. It is also possible to add biocide at first feeding location(s) and amylase enzyme inhibitor at different second feeding location(s).

The biocide may be any suitable biocide, which reduces the number of viable bacteria and/or microbes in the process at least 80%. Similarly the amylase enzyme inhibitor may be any substance that inhibits the formation of or deactivates the amylase enzyme, such as a zinc inhibitor. Preferably the amylase enzyme inhibitor may be any suitable inhibitor reducing starch degradation under process conditions at least 20%.

According to an embodiment of the invention the biocide can be an oxidizing biocide or non-oxidizing biocide.

According to one embodiment of the invention the biocide may be selected from a group comprising oxidizing biocides, such as sodium hypochlorite, hypobromous acid, chlorine dioxide; halogenated hydantoins, such as bromochloro-dimethylhydantoin; partially halogenated hydantoins such as monochloro-dimethylhydantoin; haloamines, such as chloramines or bromamines; or their mixture. A haloamine, which is suitable for use in one embodiment of the present invention may be formed by combining an ammonium source, such as ammonium sulfate, ammonium chloride, ammonium bromide, ammonium phosphate, ammonium nitrate or any other ammonium salt, including urea, with an oxidant such as sodium hypochlorite. Biocide may be added continuously to provide a total active chlorine concentration of from about 0.1-5 ppm throughout the treated portions of the system. More preferably, the active chlorine concentration in these portions of the system is about 0.75-2 ppm. It is also possible to add biocide by using slug dosing, which refers to periodical, or batch, dosing of biocide into the process, as contrasted with a continuous dosing. Typically a slug dose is 1-10 ppm, preferably 3-7 ppm. The slugs would preferably be fed for about 3-30 minutes each about 6-24 times a day, and are more preferably fed for about 5-15 minutes each about 12-24 times a day.

In an embodiment of the invention, the non-oxidizing biocides can include glutaraldehyde, 2,2-dibromo-3-nitrilo-propionamide (DBNPA), 2-bromo-2-nitropropane-1,3-diol (Bronopol), quaternary ammonium compounds, carbamates, 5-chloro-2-methyl-4-isothiazolin-3-one (OMIT), 2-methyl-4-isothiazolin-3-one (MIT), 1,2-dibromo-2,4-dicyanobutane, bis(trichloromethyl)sulfone, 2-bromo-2-nitrostyrene, 4,5-dichloro-1,2-dithiol-3-one, 2-n-octyl-4-isothiazolin-3-one, 1,2-benzisothiazlin-3-one, orthophthaldehyde, quaternary ammonium compounds (="quats"), such as n-alkyldimethyl benzyl ammonium chloride, didecyl dimethyl ammonium chloride (DDAC) or alkenyl dimethylethyl ammonium chloride, guanidines, biguanidines, pyrithiones, 3-iodopropynyl-N-butylcarbamate, phosphonium salts, such as tetrakis hydroxymethyl phosphonium sulfate (THPS), dazomet, 2-(thiocyanomethylthio) benzothiazole, methylene bisthiocyanate (MBT), and a combination thereof. Preferred non-oxidizing biocides are selected from glutaraldehyde, 2,2-dibromo-3-n itrilopropionamide (DBNPA), 2-bromo-2-nitropropane-1,3-diol (Bronopol), quaternary ammonium compounds, carbamates, 5-chloro-2-methyl-4-isothiazolin-3-one (OMIT) and 2-methyl-4-isothiazolin-3-one (MIT).

EXPERIMENTAL

Unless otherwise stated, the data in percent is always percent by weight.

Standard Viscosity was Determined by the Following Method:

At first a salt solution is made by dissolving sodium chloride (525 g) in de-ionized water (3000 g) in a beaker equipped with a magnetic bar and magnetic stirred. The mixture is stirred with maximum speed of the magnetic stirred until sodium chloride was fully dissolved.

De-ionized water (200.0 g) is dosed into a beaker. Magnetic stirrer bar is added into the beaker and stirred with maximum speed of magnetic stirrer. Cationic polyacrylamide polymer 0.330 g is dosed into the beaker in 15 seconds while stirring. The mixture is stirred with magnetic stirred for 5 min with maximum speed and then 25 min with 350 rpm. The salt solution (117.5 g, 15% (w/w) NaCl) is added into the beaker and the mixture is stirred for 5 min. The formed solution is filtered through 10 cm diameter, 250 micron stainless steel mesh sieve. Viscosity of the filtered solution (1.0% (w/w) sample in 5.5% (w/w) NaCl solution) is then determined with a Brookfield DV I+ viscometer, equipped with UL adapter ULA-35Z and YULA-15Z ULA spindle at 25° C. with maximum rotation speed. Sample size in viscosity determination is 16 ml.

Solution Viscosity was Determined with the Following Method:

Cationic polyacrylamide (2.50 g) was dissolved in water (497.5 g) to make 0.5% CPAM solutions. Viscosities were measured by Brookfield DV1, equipped with small sample adapter, at 25° C. with spindle S31 with maximum rotation speed.

Example 1. General Procedure for Exemplary Production of a Copolymer of Acrylamide and Cationic Monomers A reactor is charged with acrylamide solution (50 wt-%) and ADAM-Cl solution (80 wt-%) in a molar ratio given for each polymer product. pH is adjusted to about 2.5-4.5 by adding adipic acid 1 wt-% of total amount of monomers. Other chemicals, such as chain transfer agents, chelating agents, and thermal initiators are added to the monomer mixture. Then, the solution is purged with nitrogen gas. Polymerization is initiated by injecting a redox pair initiator system into the polymerization reactor. A cationic polyacrylamide gel is obtained as a result of the polymerization reaction. The gel is dried and finally powder or particles are obtained. The polymer compositions have dry content about 95-98 wt-%. Polymer properties are measured by using the obtained powder.

Example 2. Compositions of Ionically Crosslinked Copolymers of Acrylamide and Cationic Monomers Compositions of copolymers of acrylamide and cationic monomers, and citric acid or adipic acid added post-polymerization as ionic crosslinker agent are made by adding powder of cationic polyacrylamide in water and stirring with magnetic stirrer at 25° C. for 60 min and then adding acid to the polymer solution and stirring 15 min with magnetic stirrer. An example of polymer solution is presented in Table 1. CPAM in the solution is CPAM 49 mol-% ADAM-Cl, dry content 95%. Charge density of CPAM 49 mol-% is 3.7 meq/g polymer and total cationic charge in 0.5% solution is 18.5 meq/liter. MW of citric acid is 192.1 g/mol. Citric acid is tribasic acid and thus each mol of citric acid contains 3 equivalents of potential anions. Thus, for example 0.22 g citric acid may contain up to 3.4 meq anionic charges. Properties of the solutions and equivalent ratios of carboxyl groups:cationic monomers are in Table 2 The solutions are used in application example 1.

TABLE 1

Preparation and properties of CPAM (49 mol-% ADAM-CI) non-crosslinked reference and ionically crosslinked composition sample (CS) solutions (2.6 g of CPAM with dry content 95% in 500 ml water, i.e. 0.5 w-% CPAM solution). Cationic charge of each sample was 18.5 meq/liter. For each sample the CPAM was polymerized in the presence of same amount of adipic acid, 1% (w/w) of CPAM, taken into account in equivalent ratios. Solution and standard viscosities were measured as defined earlier.

| Sample | Post-polymerization added citric acid (g/% of CPAM) | Post-polymerization added adipic acid (g/% of CPAM) | Equivalent ratio of carboxyl:cationic monomer | Anionic charge (meq/liter) | pH | Solution Viscosity mPas | Standard viscosity mPas |
|---|---|---|---|---|---|---|---|
| Ref. | 0 | 0 | 1:27 | 0.7 | 3.81 | 471 | 3.0 |
| CS1 | 0.11/4.5 | 0 | 1:4.4 | 4.2 | 2.98 | 438 | 2.7 |
| CS2 | 0.23/9.0 | 0 | 1:2.4 | 7.7 | 2.85 | 425 | 2.7 |
| CS3 | 0.34/13.5 | 0 | 1:1.6 | 11.2 | 2.78 | 416 | 2.7 |
| CS4 | 0 | 0.13/5.0 | 1:4.5 | 4.1 | 3.37 | 463 | 2.7 |
| CS5 | 0 | 0.25/10 | 1:2.5 | 7.5 | 3.28 | 466 | 2.7 |
| CS6 |  | 0.38/15 | 1:1.7 | 10.9 | 3.19 | 457 | 2.7 |

From Table 1 it can be seen that the ionically crosslinked CPAM samples have decreased standard and solution viscosities compared to the non-crosslinked reference. Additionally, it can be seen that the solution viscosity decrease is more pronounced with higher relative crosslinker amount, and that higher viscosity decrease is obtained with tribasic crosslinker agent compared to divalent crosslinker agent, even for similar equivalent ratios.

Application Examples

Pulp Preparation

European testliner board was used as raw-material. This testliner contains about 5% surface size starch, which was enzymatically degraded native corn starch. Dilution water was made from tap water by adjusting $Ca^{2+}$ concentration to 520 mg/l by $CaCl_2$ and by adjusting conductivity to 4 mS/cm by NaCl. Testliner board was cut to 2*2 cm squares. 2.7 l of dilution water was heated to 85° C. The pieces of testliner were wetted for 5 minutes in dilution water at 2% concentration before disintegration. Slurry was disintegrated in Britt jar disintegrator with 30 000 rotations. Pulp was diluted to 0.5% by adding dilution water.

DDA Test

DDA (dynamic drainage analyzer) from Akribi Kemi Konsulter, Sweden, was used to measure retention and drainage. 500 ml of pulp was used for each test point. Pulp was poured to DDA 30 s before drainage and DDA stirrer was adjusted to 1000 rpm. Polymer was added 10 s before drainage. Stirring was stopped 2 s before drainage. Vacuum was 300 mBar for 30 s after drainage started, wire opening was 0.25 mm.

Drainage time was recorded, filtrate turbidity and PCD was measured immediately. DDA sheets were weighted and pressed in sheet press for 1 min at 4 bar having 2 plotter papers both sides. Sheets from the wire were dried in Lorenzt & Wettre hot plate dryer to abs dry for retention calculation. SCT measurements according to ISO 9895 were repeated 6 times from each DDA sheet. Result was indexed based on the basis weight (sheet dry weight/area) of the DDA-sheet.

Determination of retention of the starch originating from the recycled pulp (in this case degraded nonionic starch originating from the coating of the testliner board) was made from DDA filtrate. This determination is also suitable for measuring starch amount in pulp. 25 ml of filtrate (or pulp) was added into 10 ml of 10%-w HCl. Mixture was stirred for 10 min with magnetic stirrer and filtrated by gravitation in a funnel with a black ribbon filter paper. 1 ml of filtrated mixture was added to 8.5 ml water. 0.5 ml iodine reagent, which consisted 7.5 g KI/l+5 g/l $I_2$ was added and absorbance value was measured at 610 nm by Hach Lange DR 900 spectrophotometer 1 min after iodine-solution was added. Zeroing of the spectrophotometer was done with the sample before iodine addition. C*film 07311 non-ionic degraded starch was used as reference to make calibration equation for starch content. Blank test for HCl-iodine solution absorbance was made to subtract baseline absorbance from the result. Starch retention was calculated as: (pulp starch−filtrate starch)/pulp starch*100%. Starch reduction was calculated as: (filtrate starch of zero test−filtrate starch)/filtrate starch*100%.

Application Example 1

Test chemicals used in the example are presented in Table 2. The dosing and dosing times of the chemicals are presented in Table 3. Citric acid was added to CPAM at dissolving, the ionically crosslinked CPAM samples marked as CS1, CS2 and CS3 are same as in Table 1. The dosing times refer to time before drainage.

TABLE 2

Test chemicals.

| Additive | Description | Parameters | Concentration |
|---|---|---|---|
| PAC | Polyaluminium chloride silicate | 5.2% Al, 70% Basicity | not diluted further |
| Silica | FennoSil 442 (Kemira) | | dosing at 0.08% |
| CPAM | copolymer of ADAM-Cl and acrylamide | 49 mol-% cationic monomer, Mw ca. 4 000 000 g/mol | dissolving at 0.5%, dosing at 0.08% |

TABLE 3

Dosages and dosing times.

| | | time, s | |
|---|---|---|---|
| Test no. | −600 PAC kg/t prod | −15 Silica kg/t dry | −10 CPAM kg/t dry |
| 1 | 10 | 0.3 | 0 |
| 2 | 10 | 0.3 | Ref 0.3 |
| 3 | 10 | 0.3 | Ref 0.5 |
| 4 | 10 | 0.3 | CS1 0.3 |
| 5 | 10 | 0.3 | CS1 0.5 |
| 6 | 10 | 0.3 | CS2 0.3 |
| 7 | 10 | 0.3 | CS2 0.5 |
| 8 | 10 | 0.3 | CS3 0.3 |
| 9 | 10 | 0.3 | CS3 0.5 |
| 12 | | | Ref 0.3 |
| 13 | | | Ref 0.5 |
| 14 | | | CS1 0.3 |
| 15 | | | CS1 0.5 |

TABLE 4

Test results for drainage (DDA), retention (DDA), starch retention and SCT index.

| Test no. | Drainage time (s) | Retention (%) | Starch retention (%) | SCT ind (Nm/g) | CPAM (kg/t dry) | Equivalent ratio carbox:cat |
|---|---|---|---|---|---|---|
| 1 | 10 | 92 | 21 | 36 | 0 | |
| 2 | 6 | 93 | 23 | 33 | Ref 0.3 | 1:27 |
| 3 | 5 | 94 | 33 | 35 | Ref 0.5 | 1:27 |
| 4 | 6 | 93 | 27 | 35 | CS1 0.3 | 1:4.4 |
| 5 | 5 | 94 | 34 | 36 | CS1 0.5 | 1:4.4 |
| 6 | 6 | 94 | 31 | 36 | CS2 0.3 | 1:2.4 |
| 7 | 5 | 95 | 31 | 37 | CS2 0.5 | 1:2.4 |
| 8 | 6 | 94 | 30 | 36 | CS3 0.3 | 1:1.6 |
| 9 | 5 | 94 | 35 | 36 | CS3 0.5 | 1:1.6 |

TABLE 4-continued

Test results for drainage (DDA), retention (DDA), starch retention and SCT index.

| Test no. | Drainage time (s) | Retention (%) | Starch retention (%) | SCT ind (Nm/g) | CPAM (kg/ t dry) | Equivalent ratio carbox:cat |
|---|---|---|---|---|---|---|
| 12 | 6 | 93 | 14 | 35 | Ref 0.3 | 1:27 |
| 13 | 6 | 93 | 20 | 36 | Ref 0.5 | 1:27 |
| 14 | 6 | 94 | 20 | 35 | CS1 0.3 | 1:4.4 |
| 15 | 6 | 94 | 27 | 37 | CS1 0.5 | 1:4.4 |

From Table 4 it can be seen that a CPAM flocculant is essential for obtaining improved drainage performance, and that ionic crosslinking does not disturb the drainage performance of the CPAM. When a 3-component program of PAC, silica and CPAM is used, a significant improvement of starch retention can be seen over CPAM alone, especially when using 3-component program with the ionically crosslinked CPAM of the present invention. As use of CPAM increases overall retention and flocculation, it is natural that SCT strength decreases. While the ionically crosslinked CPAM of the present invention achieves in both programs the same improvement of overall retention and drainage as the non-crosslinked CPAM, there is no decrease in SCT strength, even a slight increase in SCT can be seen in test no. 7. Further, it can be seen that the starch retention increases as the amount of ionic crosslinker agent increases. It is believed that the more structured, ionically crosslinked CPAM is better option for trapping of the degraded nonionic starch originating from the surface size of the testliner board.

Application Example 2

Compositions of ionically crosslinked copolymers used in this example were manufactured as disclosed in Example 2, with properties presented in Table 5. Dosing times before drainage, dosages and test results are presented in Table 6.

TABLE 5

Compositions of ionically crosslinked copolymers of acrylamide and varying amounts of ADAM-Cl/cationic charge

| Sample | cationic monomers in CPAM (mol-%) | Post-polymerization added citric acid (% of CPAM) | Eq.ratio of carboxyl:cationic monomer | Cationic charge (meq/ liter) | Anionic charge (meq/ liter) | MWr, about (g/mol) | Std. viscosity mPas |
|---|---|---|---|---|---|---|---|
| Comp 1 | 5 | 3.3 | 1:1.3 | 3.2 | 2.6 | 6M | 3.1 |
| Comp 2 | 10 | 3.3 | 1:2.3 | 6.0 | 2.6 | 6M | 3.5 |
| CS7 | 20 | 10 | 1:1.3 | 10.5 | 7.8 | 4M | 2.7 |
| CS8 | 33 | 10 | 1:1.9 | 14.8 | 7.8 | 4M | 2.7 |
| CS9 | 49 | 10 | 1:2.4 | 18.5 | 7.8 | 4M | 2.7 |

TABLE 6

Dosing times, dosages and test results.

| time, s Test no. | −10 Comp 2. kg/t dry | −10 CS7 kg/t dry | −10 CS8 kg/t dry | −10 CS9 kg/t dry | Cationic monomers (mol-%) | Eq.ratio | SCT index (Nm/g) | Starch reduction (%) |
|---|---|---|---|---|---|---|---|---|
| 16* | 0 | | | | | | 14.9 | |
| 17 | 0.3 | | | | 10 | 1:2.3 | 13.4 | 14 |
| 18 | 0.5 | | | | 10 | 1:2.3 | 14.0 | 19 |
| 19 | | 0.5 | | | 20 | 1:1.3 | 14.4 | 21 |
| 20 | | | 0.5 | | 33 | 1:1.9 | 14.3 | 21 |
| 21 | | | | 0.3 | 49 | 1:2.4 | 14.5 | 16 |
| 22 | | | | 0.5 | 49 | 1:2.4 | 14.8 | 25 |

*zero test

From Table 6 it can be seen that ionically crosslinked CPAMs having higher cationicity provided higher SCT strengths and starch reductions, compared to CPAM having cationicity of 10 mol-%.

Application Example 3

Same samples were used as in the previous example, presented in Table 5. Dosing times before drainage and dosages are presented in Table 7 and test results in Table 8.

TABLE 7

Dosing times and dosages.

| time, s test no. | −600 PAC kg/t prod | −15 Silica kg/t dry | −10 Comp1 kg/t dry | −10 CS7 kg/t dry | −10 CS8 kg/t dry | −10 CS9 kg/t dry |
|---|---|---|---|---|---|---|
| 23 | 10 | | | | | |
| 24 | 10 | 0.45 | | | | |
| 25 | 10 | 0.45 | 0.4 | | | |
| 26 | 10 | 0.45 | 0.8 | | | |
| 27 | 10 | 0.45 | | 0.4 | | |
| 28 | 10 | 0.45 | | 0.8 | | |
| 29 | 10 | 0.45 | | | 0.4 | |
| 30 | 10 | 0.45 | | | 0.8 | |
| 31 | 10 | 0.45 | | | | 0.4 |
| 32 | 10 | 0.45 | | | | 0.8 |

TABLE 8

| test no. | Cationic monomers (mol-%) | Equivalent ratio carboxyl:cationic monomers | DDA drainage time, s | Retention, % | Turbidity, NTU | Starch reduction, % |
|---|---|---|---|---|---|---|
| 23* | | | 7.3 | 90 | 557 | 0 |
| 24 | | | 15.2 | 91 | 538 | 4 |
| 25 | 5 | 1:1.3 | 7.2 | 93 | 105 | 9 |
| 26 | 5 | 1:1.3 | 6.9 | 93 | 101 | 12 |
| 27 | 20 | 1:1.3 | 7.0 | 95 | 75 | 13 |
| 28 | 20 | 1:1.3 | 5.9 | 93 | 77 | 15 |
| 29 | 33 | 1:1.9 | 7.8 | 95 | 83 | 14 |
| 30 | 33 | 1:1.9 | 6.4 | 94 | 86 | 19 |
| 31 | 49 | 1:2.4 | 8.1 | 94 | 83 | 16 |
| 32 | 49 | 1:2.4 | 6.0 | 94 | 87 | 19 |

*zero test

From Table 8 it can be seen that ionically crosslinked CPAMs having cationicity above 15 mol-% (test no. 27-32) provided higher starch reductions and lower turbidities, compared to CPAM having cationicity of just 5 mol-%. Additionally, ionically crosslinked CPAMs having higher cationicity provided improved drainage and retention even at lower dosage. Further it can be seen that when the relative amount of carboxyl to cationic monomers was higher, shorter drainage times were obtained, as well as lower turbidities suggesting improved colloids retention.

The invention claimed is:

1. A method for making of paper, board or the like, comprising the steps of:
    providing a pulp,
    dissolving into an aqueous solution a composition comprising:
        (i) a copolymer of acrylamide and at least one cationic monomer, the copolymer comprising cationic monomers of at least 15 mol-%, calculated from the total amount of monomers, and
        (ii) an ionic crosslinker agent comprising at least two carboxyl groups, wherein the equivalent ratio of carboxyl groups:cationic monomer is between 1:20 and 1:0.5, whereby an aqueous treatment solution is obtained,
    adding the obtained treatment solution to the pulp, and forming the pulp into a fibrous web.

2. The method according to claim 1, wherein the pulp has a conductivity of at least 1 mS/cm in the head box stock.

3. The method according to claim 1, wherein the copolymer of acrylamide comprises cationic monomers of at least 20 mol-%.

4. The method according to claim 1, wherein the cationic monomer of the copolymer is selected from 2-(dimethylamino)ethyl acrylate (ADAM), [2-(acryloyloxy)ethyl] trimethylammonium chloride (ADAM-Cl), and any combination thereof.

5. The method according to claim 1, wherein the equivalent ratio of carboxyl groups:cationic monomer in the ionic crosslinker agent is between 1:15 and 0.8.

6. The method according to claim 1, wherein the copolymer of acrylamide further comprises anionic monomers, provided that the net charge of the copolymer is cationic at pH 7.

7. The method according to claim 1, wherein the composition is in the form of a dry powder.

8. The method according to claim 1, wherein the amount of ionic crosslinker agent is in a range of 2-20 weight-% of copolymer of acrylamide expressed as citric acid equivalent based on the molar weight of the citric acid.

9. The method according to claim 1, wherein the pulp comprises at least 50 weight-% of the dry fiber furnish recycled paper, or board or the like pulped in a pulper and/or unbleached kraft pulp and/or unbleached semichemical pulp.

10. The method according to claim 1, wherein the pulp comprises starch in an amount of at least 0.5 weight-%, based on dry total solids, as measured at a pulp storage or at a broke storage.

11. The method according to claim 1, wherein the composition is used in an amount of 50-1000 dry g/t dry pulp.

12. The method according to claim 1, wherein the obtained treatment solution is added after the last shear stage and prior to a head box of a paper or board machine.

13. The method according to claim 1, further comprising adding at least one amylase inhibitor and/or biocide to the pulp and/or a broke.

14. The method according to claim 1, wherein the pulp has a conductivity of at least 3.5 mS/cm in the head box stock.

15. The method according to claim 1, wherein the pulp has a conductivity of at least 3 mS/cm in the head box stock.

16. The method according to claim 1, wherein the copolymer of acrylamide comprises cationic monomers of at least at least 45 mol-%.

17. The method according to claim 1, wherein the equivalent ratio of carboxyl groups:cationic monomer in the ionic crosslinker agent is between 1:10 and 1:1.

18. The method according to claim 1, wherein the amount of ionic crosslinker agent is in a range of 5.5-20 weight-% of copolymer of acrylamide expressed as citric acid equivalent based on the molar weight of the citric acid.

19. The method according to claim 1, wherein the pulp comprises starch in an amount of at least 4 weight-%, based on dry total solids, as measured at a pulp storage or at a broke storage.

20. The method according to claim 1, wherein the composition is used in an amount of 300-800 dry g/t dry pulp.

* * * * *